United States Patent
Willenbring et al.

(10) Patent No.: US 11,713,949 B2
(45) Date of Patent: Aug. 1, 2023

(54) CO-LOCATED SENSORS FOR PRECISION GUIDED MUNITIONS

(71) Applicant: Rockwell Collins, Inc., Cedar Rapids, IA (US)

(72) Inventors: Gary Willenbring, Waconia, MN (US); William Durand, Edina, MN (US)

(73) Assignee: Simmonds Precision Products, Inc., Vergennes, VT (US)

( * ) Notice: Subject to any disclaimer, the term of this patent is extended or adjusted under 35 U.S.C. 154(b) by 278 days.

(21) Appl. No.: 17/102,317

(22) Filed: Nov. 23, 2020

(65) Prior Publication Data
US 2022/0163303 A1 May 26, 2022

(51) Int. Cl.
| | |
|---|---|
| *F42B 15/01* | (2006.01) |
| *F41G 7/22* | (2006.01) |
| *H01Q 1/28* | (2006.01) |
| *H01Q 1/38* | (2006.01) |
| *F41G 7/00* | (2006.01) |

(52) U.S. Cl.
CPC ............ *F42B 15/01* (2013.01); *F41G 7/2293* (2013.01); *H01Q 1/281* (2013.01); *H01Q 1/38* (2013.01)

(58) Field of Classification Search
None
See application file for complete search history.

(56) References Cited

U.S. PATENT DOCUMENTS

| | | | | |
|---|---|---|---|---|
| 3,975,737 A | * | 8/1976 | Jones, Jr | H01Q 1/405 343/770 |
| 4,101,895 A | * | 7/1978 | Jones, Jr. | H01Q 1/281 343/846 |
| 4,287,520 A | * | 9/1981 | Van Vliet | H01Q 1/425 343/754 |
| 5,182,564 A | | 1/1993 | Burkett et al. | |
| 5,214,438 A | | 5/1993 | Brusgard et al. | |

(Continued)

FOREIGN PATENT DOCUMENTS

| | | |
|---|---|---|
| CN | 102623789 B | 6/2015 |
| EP | 3290856 A1 | 3/2018 |

(Continued)

OTHER PUBLICATIONS

Extended Search Report in European Application No. 21209886.7 dated Apr. 8, 2022.

*Primary Examiner* — Bernarr E Gregory
(74) *Attorney, Agent, or Firm* — Suiter Swantz pc llo

(57) ABSTRACT

A precision guided munition (PGM) system is disclosed. The PGM system comprises a body including a nose portion. The nose portion includes an aperture. A window is attached, secured, or adhered to the body at the nose portion. One or more antenna substrates is attached, secured, or adhered to the window. A plurality of radiating elements is attached, secured, or adhered to the one or more antenna substrates. An image sensor configured to capture an image in front of the body. The image sensor is behind the aperture and is configured to focus at an infinity focus in front of the body. The one or more antenna substrates include unpopulated areas configured to let photons pass through the antenna substrates from the window to the image sensor. The photons are parallel or collimated and the captured image does not include features of the antenna substrates.

20 Claims, 9 Drawing Sheets

(56) References Cited

U.S. PATENT DOCUMENTS

| | | | |
|---|---|---|---|
| 5,307,077 A * | 4/1994 | Branigan | F41G 7/2286 |
| | | | 343/781 CA |
| 5,652,631 A * | 7/1997 | Bullen | H01Q 1/425 |
| | | | 343/753 |
| 6,150,974 A * | 11/2000 | Tasaka | F41G 7/2293 |
| | | | 250/339.05 |
| 6,816,112 B1 | 11/2004 | Chethik et al. | |
| 7,109,935 B2 | 9/2006 | Saint Clair et al. | |
| 7,346,281 B2 | 3/2008 | Wilcken et al. | |
| 8,963,789 B2 | 2/2015 | Yueh-Chi | |
| 8,989,584 B2 | 3/2015 | Ruggiero et al. | |
| 9,595,757 B2 | 3/2017 | Saint Clair et al. | |
| 10,379,217 B2 | 8/2019 | Wang et al. | |
| 10,615,479 B2 | 4/2020 | Stratis et al. | |
| 2003/0043085 A1* | 3/2003 | Park | H01Q 13/10 |
| | | | 343/895 |
| 2005/0093757 A1* | 5/2005 | Kiernan, Jr. | F41G 7/2286 |
| | | | 343/781 CA |
| 2015/0323287 A1* | 11/2015 | Durand | F41G 7/2286 |
| | | | 244/3.19 |
| 2015/0377479 A1 | 12/2015 | Pescod et al. | |
| 2016/0125713 A1 | 5/2016 | Blech et al. | |
| 2016/0291146 A1 | 10/2016 | Wang et al. | |
| 2017/0288303 A1* | 10/2017 | Stratis | H01Q 1/28 |
| 2018/0053994 A1* | 2/2018 | Grando | H01Q 1/281 |
| 2018/0123229 A1* | 5/2018 | Stratis | H01Q 3/247 |
| 2020/0005097 A1 | 1/2020 | Sinclair et al. | |

FOREIGN PATENT DOCUMENTS

| | | |
|---|---|---|
| GB | 2511845 A | 9/2014 |
| WO | 2020208057 A1 | 10/2020 |

\* cited by examiner

CO-LOCATED SENSORS FOR PRECISION GUIDED MUNITIONS

SUMMARY

A precision guided munition (PGM) system is disclosed in accordance with one or more embodiments of the present disclosure. In one illustrative embodiment, the PGM system comprises a body including a nose portion. The nose portion includes an optical aperture. In another illustrative embodiment, the PGM system comprises a window attached, secured, or adhered to the body at the nose portion. In another illustrative embodiment, the PGM system comprises one or more antenna substrates attached, secured, or adhered to the window. In another illustrative embodiment, the PGM system comprises a plurality of radiating elements attached, secured, or adhered to the one or more antenna substrates. In another illustrative embodiment, the PGM system comprises an image sensor configured to capture an image in front of the body. The image sensor is behind the aperture and is configured to focus at an infinity focus in front of the body. The one or more antenna substrates include unpopulated areas configured to let photons pass through the antenna substrates from the window to the image sensor. The photons are parallel or collimated and the captured image does not include features of the antenna substrates.

A co-located sensor system is disclosed in accordance with one or more embodiments of the present disclosure. In one illustrative embodiment, the co-located sensor system comprises a housing including an optical aperture. In another illustrative embodiment, the co-located sensor system comprises a window attached, secured, or adhered to the housing at the optical aperture. In another illustrative embodiment, the co-located sensor system comprises one or more antenna substrates attached, secured, or adhered to the window. In another illustrative embodiment, the co-located sensor system comprises a plurality of radiating elements attached, secured, or adhered to the one or more antenna substrates. In another illustrative embodiment, the co-located sensor system comprises an image sensor configured to capture an image in front of the body. The image sensor is behind the aperture and is configured to focus at an infinity focus in front of the body. The one or more antenna substrates include unpopulated areas configured to let photons pass through the antenna substrates from the window to the image sensor. The photons are parallel or collimated and the captured image does not include features of the antenna substrates.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1A:
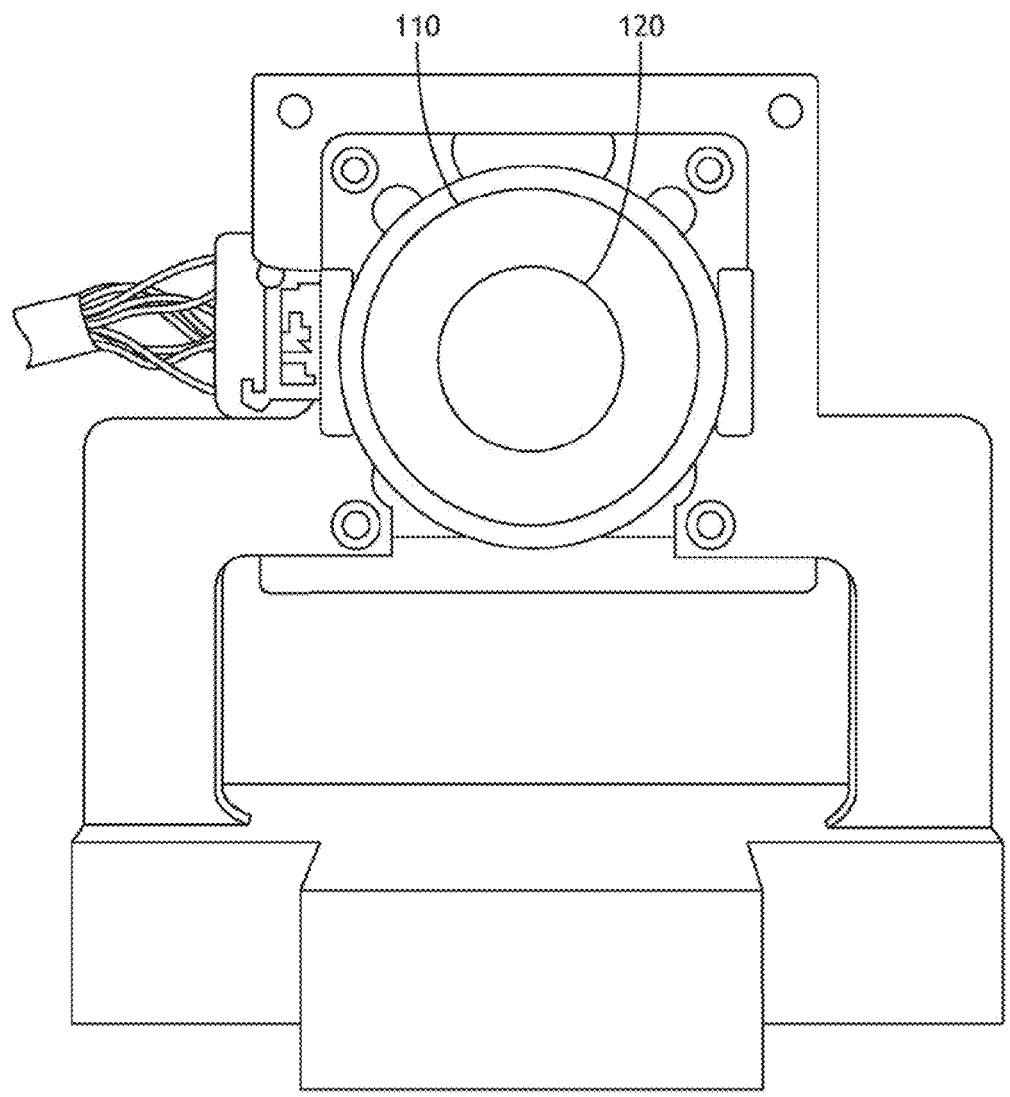
FIG. 1A is a drawing illustrating an image collection experiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Precision guided munitions (PGMs), also known as precision guided weapons (PGWs), precision guided missiles (PGMs), or homing missiles, are intended to identify and track a specific target, and to precisely hit the target to minimize collateral damage and to increase lethality against intended targets. Because the damage effects of explosive munitions generally increase with targeting accuracy, even modest improvements in accuracy (hence, a reduction in miss distance) may enable a target to be engaged with fewer assets.

To increase the accuracy of a small homing missile, an electro-optical infrared (EOIR) sensor (e.g., an imaging sensor) can be combined with a radio-frequency (RF) sensor (e.g., an active or passive radar) on the nose of the missile to capture two different signals of the same target. These sensors may reinforce each other such that they improve the ability to locate and identify the target. RF and EOIR sensors bring significant capabilities to precision munitions. As costs for electrical components are reduced, these sensors may be employed across a wider range of applications including smaller PGMs.

Smaller PGMs have less surface area on the nose for sensor apertures. Both the EOIR and active and passive radars achieve optimal performance when located in the nose of the missile such that they both capture an accurate signal from an area directly ahead of the missile. A large flat area on the front of the nose of the missile where each aperture can be separately located is impractical for aerodynamic purposes. Air drag may slow down the missile, which may make the missile an easier target for air defense systems (e.g., systems that intercept missiles, rockets, or other projectiles). Thus, solutions to alleviate the problem of limited area for sensor apertures on the nose of a missile are desirable.

The present disclosure is directed to a precision guided munition system including an aperture in which an EOIR sensor (e.g., image sensor or multispectral camera) and an RF sensor (e.g., an antenna, passive radar, active radar, etc.) are co-located. The co-located solution is enabled using aperture designs for EOIR and RF sensors that are agreeable with a PGM nose profile. The EOIR sensor and the RF sensor may share centers which are aligned to a longitudinal axis of the missile (i.e., concentric centers such that the longitudinal axis passes through the centers and is normal to a flat surface of the window). The co-located aperture may be implemented using one or more lenses and a window. The window may provide a flat support surface (i.e., substrate) for an RF antenna to be attached, secured, or adhered thereto. The shape of the antenna and the sizing of the antenna relative to the optics may be varied.

In some embodiments, the co-located aperture diameter may be dependent upon the opaque antenna area required for operation, the optical field of view (FOV), and the distance of a window from the EOIR sensor. The antenna may include unpopulated areas (i.e., voids or holes) configured to let photons (e.g., light, illumination, rays, etc.) to pass. The antenna may be placed at a distance from the EOIR sensor such that when the EOIR sensor is configured to focus to a point of infinity in front of the PGM, rays that enter the window and pass through the voids or holes of the antenna are parallel or substantially parallel (e.g., collimated rays). The parallel rays, after passing through the voids or holes, may be captured by the EO-IR sensor.

The embodiments of the present disclosure are advantageous since the RF sensor does not block or obstruct the vision of the EOIR sensor, which is unintuitive and unexpected since the RF sensor is placed in the optical path (i.e., placed in front of) the EOIR sensor and is typically constructed from materials that are substantially opaque to the photons captured by the EOIR sensor. In other words, the EOIR sensor may capture a full scene of a target when the EOIR is configured to focus at infinity (e.g., greater than 30 feet away) in front of the munition. This optical effect may be combined with a relatively small radius of the aperture to provide a solution that is size-weight-and-power (SWaP) efficient and that maximizes the detection of signals by orienting each sensor to receive the strongest possible signal (i.e., as many photons as possible) from the direction of a target.

Figure 1B:
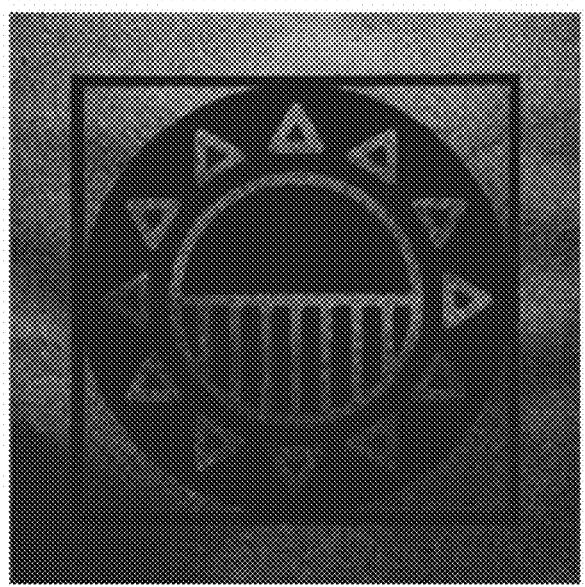
FIGS. 1B and 1C are images showing the results of the experiment of FIG. 1A.
Figure 1C:
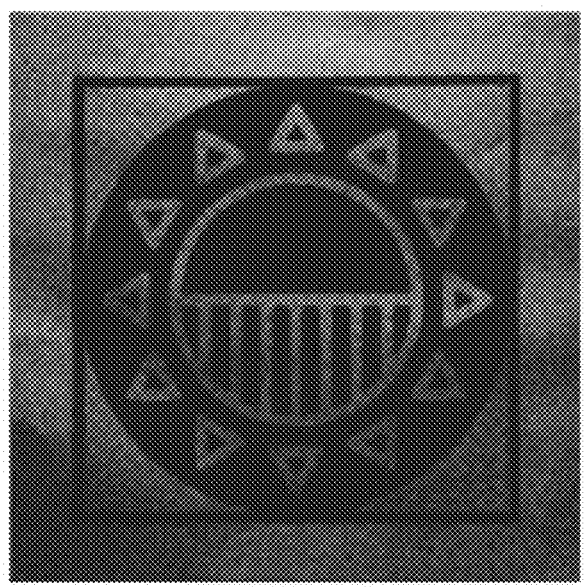

FIG. 1A is a drawing illustrating an experiment including a camera 110 (i.e., image sensor or EOIR sensor) and an opaque patch 120 in front of the camera. During the experiment, the patch 120 was placed at varying distances in front of the camera 110. Images and metrics were collected by the camera 110 and compared to a baseline image without the patch 120. FIG. 1B shows the image captured with the patch 120 in front of the camera 110. FIG. 1C shows the image captured without the patch 120 in front of the camera 110. A full image is evident with a gain and integration time indicating a relatively low loss of light entering the optics.

Figure 2A:
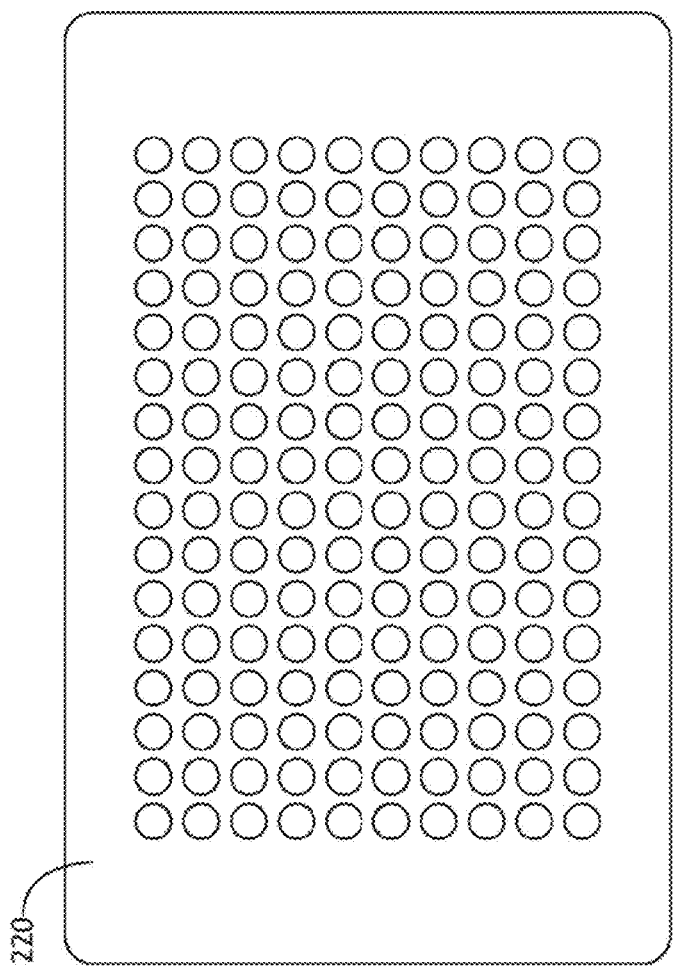
FIG. 2A is a drawing illustrating a grid pattern for an image collection experiment.

FIG. 2A is a drawing illustrating a perforated grid pattern 220 (i.e., a mask) that has a shape that is substantially similar to the shape of a substrate for a radiating element array antenna (e.g., Ka radiating element array antenna) and its input lines. As shown, the perforated grid pattern 220 has a plurality of holes that allow photons to pass through. The pattern 220 was tested in an experiment substantially similar to the experiment described with respect to FIGS. 1A-C, except that the pattern 220 replaced the patch 120.

Figure 2B:
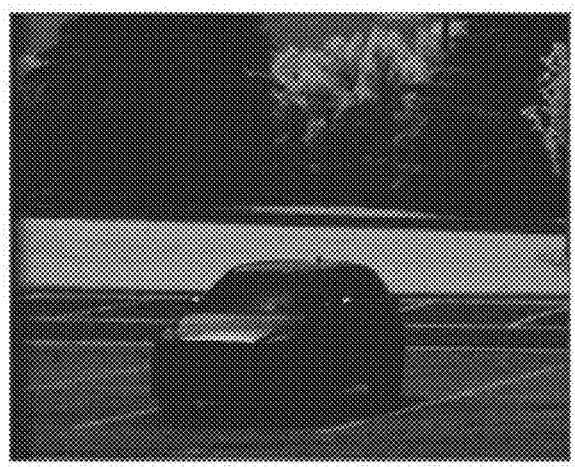
FIGS. 2B and 2C are images showing the results of the experiment of FIG. 2A.
Figure 2C:
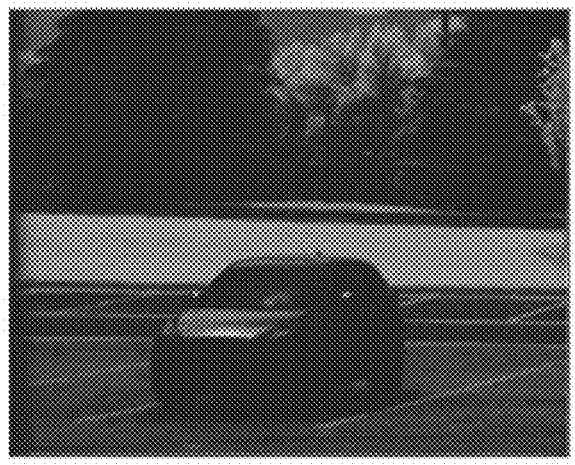
Figure 3A:
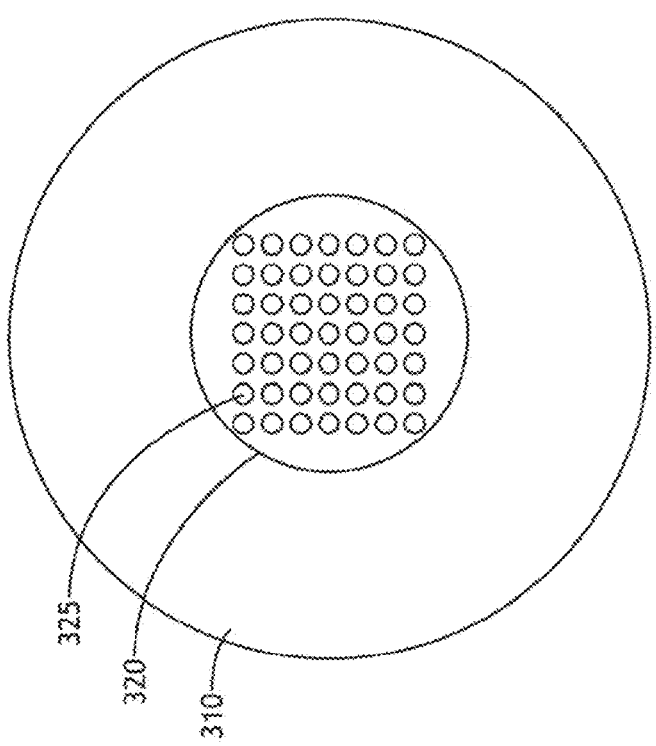
FIG. 3A is a front view of an optical aperture window including an antenna, in accordance with one or more embodiments of the present disclosure.

The pattern 220 was placed at varying distances in front of the camera 110. Images and metrics were collected by the camera 110 and compared to a baseline image without the pattern 220. FIG. 2B shows the image captured without the pattern 220 in front of the camera 110. FIG. 2C shows the image captured with the pattern 220 in front of the camera 110. The results of the experiment shown in the images of 2B-2C are substantially similar to the results of the experiment shown in the images 1B-1C, with a full image evident with a gain and integration time indicating a relatively low loss of light entering the optics FIG. 3A is a front view of an aperture window 310, in accordance with one or more embodiments of the present disclosure. The aperture window 310 includes a substrate 320 thereon. An array (not shown) comprising a plurality of radiating elements (e.g., antennas) may be adhered, attached, or secured to the substrate 320. For example, each radiating element may be placed at the intersections of the grid pattern of the substrate 320. Each radiating element may be a transceiver such that it operates as an active radar (e.g., transmits and receives RF radiation to detect targets). Each radiating element may act as a node and may be addressed (e.g., may have an [x, y] address). Input/output (IO) lines (e.g., traces, connections) may be connected to the radiating elements to transmit and receive signals and communicatively couple them to a controller, and power lines may supply power to the radiating elements. The substrate 325 may contain holes (e.g., unpopulated areas) configured to allow photons to pass (e.g., parallel or collimated photons to be collected by a sensor focused at infinity).

Figure 3B:
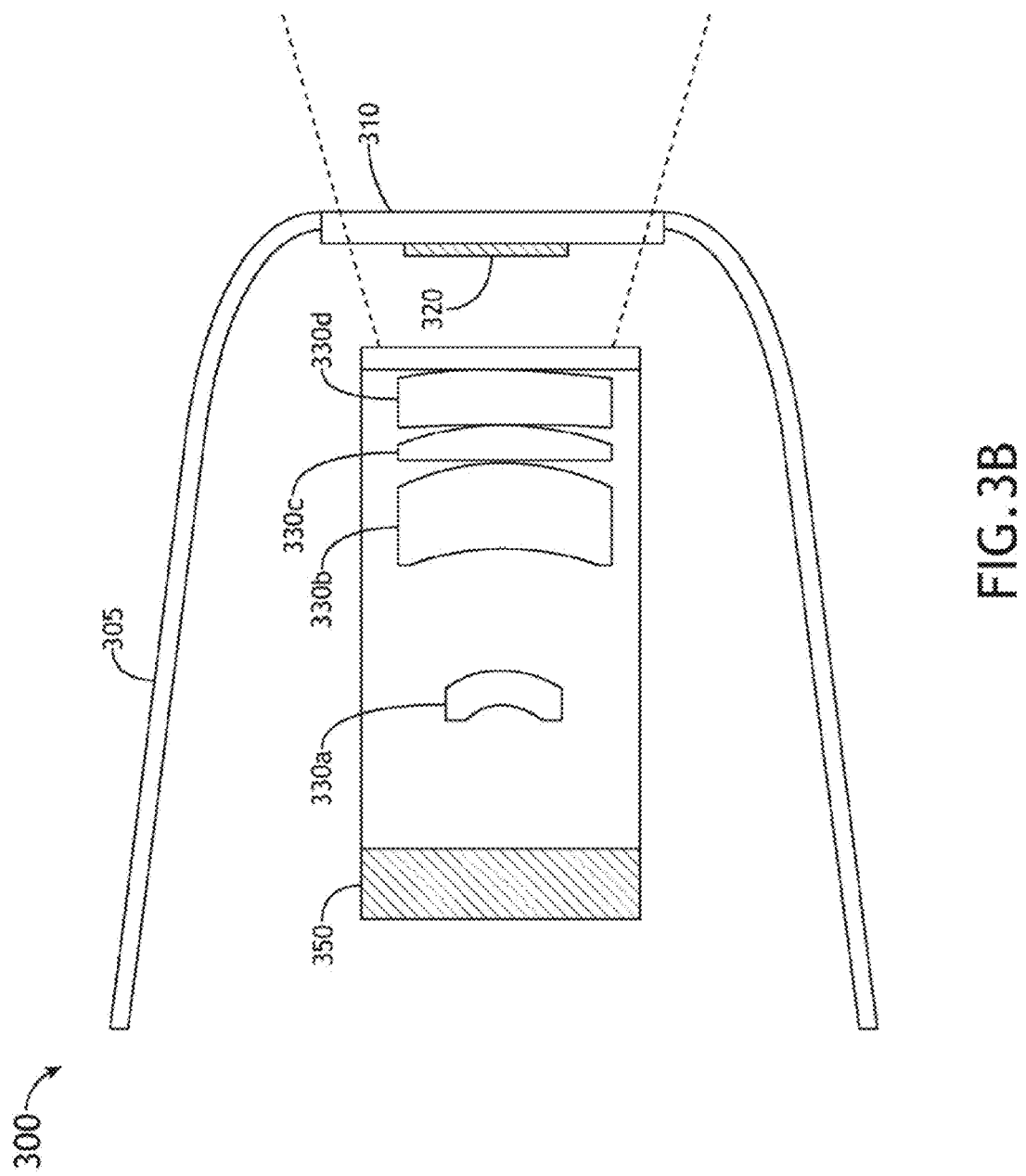
FIG. 3B is a side view of a precision guided munition system, in accordance with one or more embodiments of the present disclosure.

FIG. 3B is a side view of a precision guided missile (PGM) system 300, in accordance with one or more embodiments of the present disclosure. The precision guided missile system 300 may include a body 305, the window 310, the antenna substrate 320 with the array thereon, lenses 330a-d, and an EOIR sensor 350. The body 305 may be, for example, a missile body having a propulsion portion, a payload portion, a nose portion, one or more wings, and one or more fins. The propulsion portion may be configured to propel (e.g., self-propel) the missile body 305, and may include fuel and an engine (e.g., rocket engine). The payload portion may contain munitions or explosives that detonate upon impact of the missile body 305 with a target. The wings and fins may include spoilers configured to steer the missile body 305 in response to control signals (e.g., to accurately track and strike the identified target).

The nose portion of the body 305 may include an aperture. The EO-IR sensor 350 and the lenses 330a-d may be situated completely inside the aperture. The window 310 with the antenna substrate 320 thereon may be attached, adhered or secured to the body 305 and may seal the aperture. In some embodiments, the antenna substrate 320 with the radiating element array thereon may be situated inside the aperture (i.e., on the side of the window 310 facing the sensor 350). In some embodiments, the antenna substrate 320 with the radiating element array thereon may be situated outside the aperture (i.e., on the side of the window 310 facing the front of the body 305).

Figure 3C:
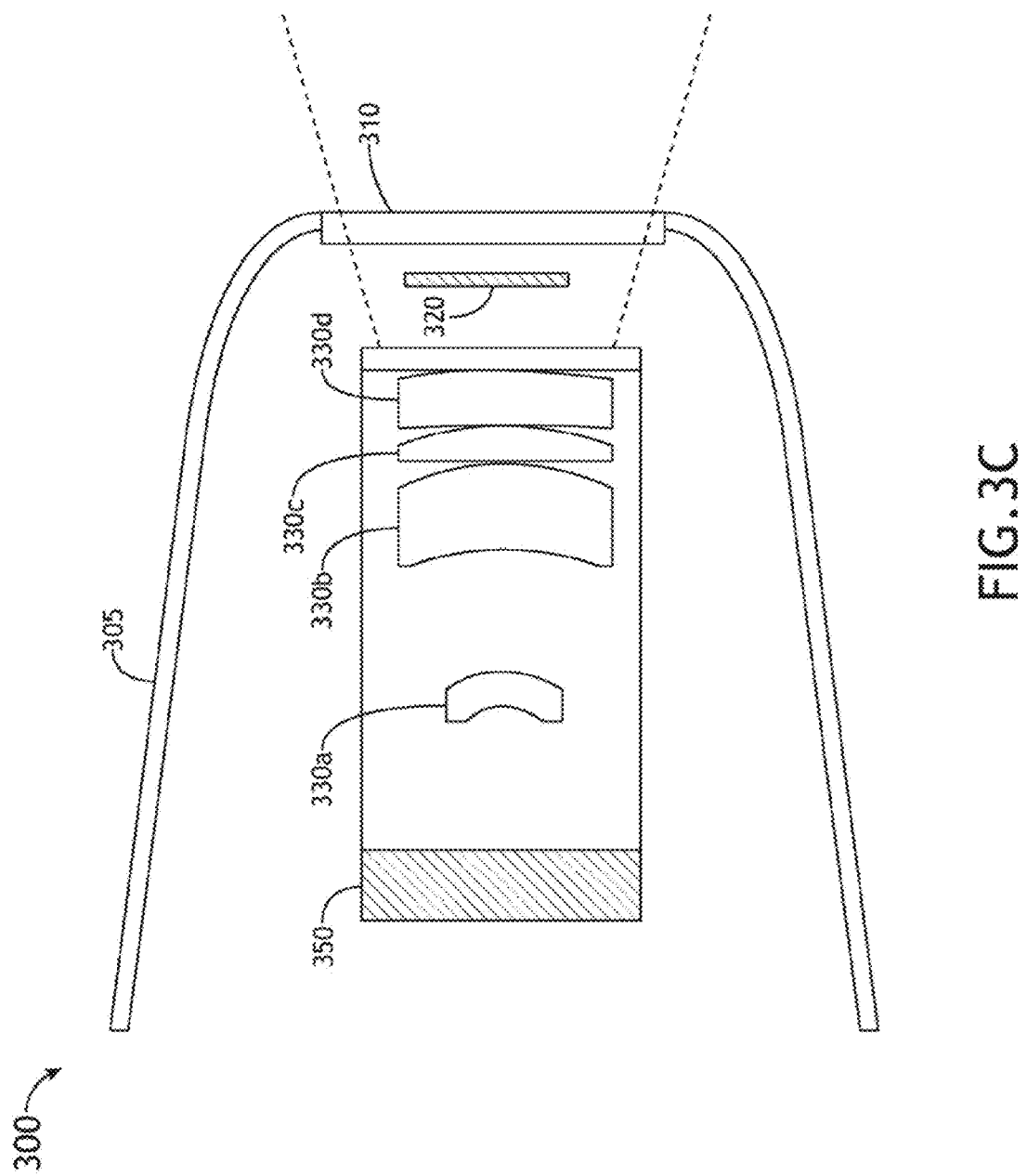
FIG. 3C is a side view of a precision guided munition system, in accordance with one or more embodiments of the present disclosure.

The EOIR sensor 350 may be an optical sensor, an IR sensor, a UV sensor, or another other photon measurement sensor. In some embodiments, the EOIR sensor 350 is a charge-coupled device (CCD) sensor. The radius of the EO-IR sensor 350, the numerical aperture (NA) value of the aperture, and the lenses 330a-d may be configured so that the EO-IR sensor 350 is focused at an infinity focus (e.g., greater than 30 feet in front of the body 305). The EOIR sensor 350, the optically transparent substrate 310, and the antenna array 320 may share centers which are aligned to a longitudinal axis of the missile body 305 (i.e., concentric centers such that the longitudinal axis passes through the centers and is normal to a flat surface of the window 310). As shown in FIG. 3C, in some embodiments, the longitudinal axis may be angled to the flat surface of the window 310. The EOIR sensor 350 may capture images to be transmitted to a controller (i.e., computing system; not shown) including one or more processors and a memory. The one or more processors may include one or more central processing unit (CPUs), graphics processing units (GPUs), application-specific integrated circuits (ASICs), and/or field-programmable gate arrays (FPGA). The memory may include nonvolatile memory (e.g., hard disk drive, SSD, flash memory, ROM, etc.) and volatile memory (RAM, SDRAM, etc.).

The one or more processors may be configured to execute program instructions stored on the memory that cause the one or more processors perform various functions, procedures, algorithms, etc. described in the present disclosure. For example, the program instructions may cause the one or more processors to receive the images and apply a target identification algorithm to the images. This algorithm may track a target and send control signals to one or more control surfaces on the body 305 to control the trajectory of the missile 305 and steer it toward the target. In some embodiments, the images are transmitted to a remote controller (e.g., wirelessly) and the images are processed remotely. Remote processing may advantageously save valuable computing capacity in the PGM system 300. Additionally, the controller may be communicatively coupled to the radiating element array and the program instructions may track or identify a target using radar information.

Since the optically transparent substrate 310 with the radiating element array thereon does not block or obstruct the vision of the EOIR sensor 350, which is unintuitive and unexpected since the substrate 320 is placed in the optical path (i.e., placed in front of) the EOIR sensor 350, the EOIR sensor 350 may capture a full scene of a target when the EOIR sensor 350 is configured to focus at infinity (e.g., greater than 30 feet away) in front of the missile body 305. This optical effect may be combined with a relatively small radius of the aperture to provide a solution that is size-weight-and-power (SWaP) efficient and that maximizes the detection of signals by orienting each sensor to receive the strongest possible signal (i.e., as many photons as possible) from the direction of a target.

Figure 4A:
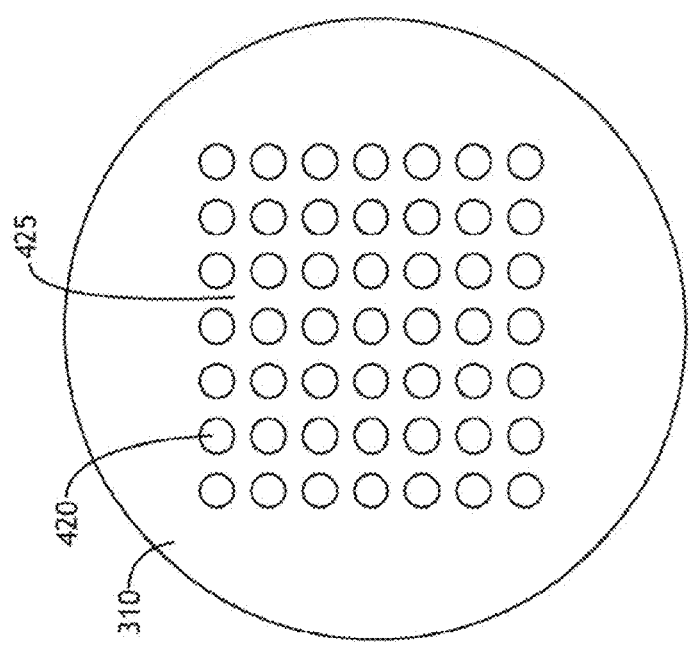
FIG. 4A is a front view of an optical aperture window including an antenna, in accordance with one or more embodiments of the present disclosure.
Figure 4B:
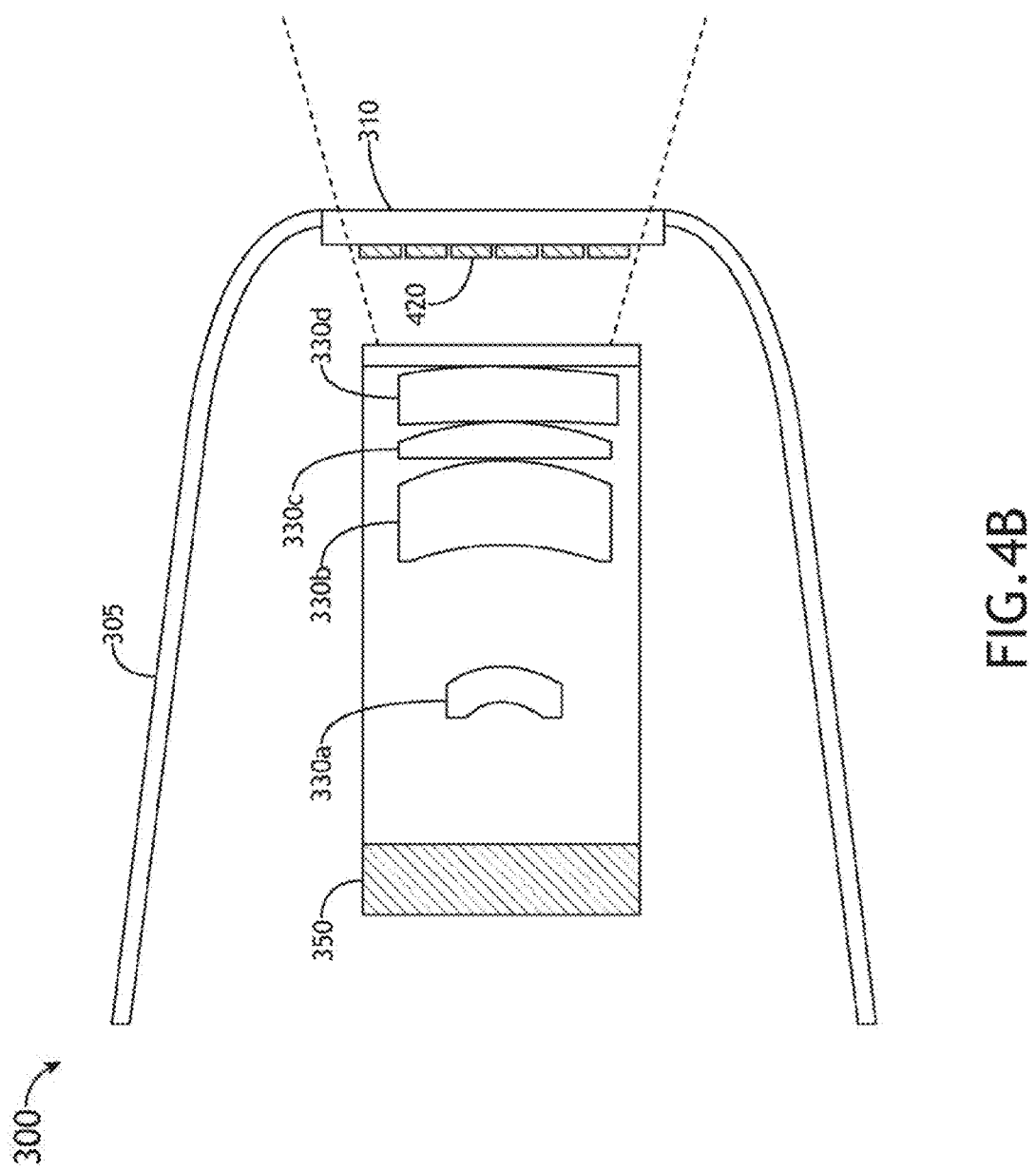
FIG. 4B is a side view of a precision guided munition system, in accordance with one or more embodiments of the present disclosure.

FIG. 4A is a front view of the aperture window 310 of FIGS. 3A-3B including antenna substrate elements 420, in accordance with one or more embodiments of the present disclosure. FIG. 4B is a side view of the precision guided munition system 300 with the antenna substrate elements 420 on the window 310. This embodiment may be substantially similar to the embodiment shown in FIGS. 3A-3B, and may produce a similar result of a full scene being captured by the sensor 350. In this embodiment, each respective one of the antenna substrate elements includes a radiating element thereon. Voids 425 between the substrates 420 are configured to let photons pass (e.g., parallel rays) to be captured by the EO-IR sensor 350 that is focused at infinity.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A precision guided munition system, comprising:
   a body including a nose portion, wherein the nose portion includes an aperture;
   a window attached, secured, or adhered to the body at the nose portion;
   one or more antenna substrates attached, secured, or adhered to the window;
   a plurality of radiating elements, wherein each respective one of the plurality of radiating elements is attached, secured, or adhered to the one or more antenna substrates; and
   an image sensor configured to capture an image in front of the body,
   wherein the image sensor is behind the aperture,
   wherein the image sensor is configured to focus at an infinity focus in front of the body,
   wherein the one or more antenna substrates include a plurality of holes arranged in a grid pattern configured to let photons pass through the antenna substrates from the window to the image sensor,
   wherein the photons are moving in parallel rays, wherein the captured image does not include features of the antenna substrates.

2. The system of claim 1, wherein the body further includes a propulsion portion configured to propel the missile body.

3. The system of claim 2, wherein the propulsion portion includes fuel and a rocket engine.

4. The system of claim 1, wherein the body further includes a payload portion configured to store munitions or explosives.

5. The system of claim 1, wherein the one or more antenna substrates is a single substrate, and the plurality of holes are holes in the single substrate.

6. The system of claim 1, wherein the one or more antenna substrates comprises a plurality of antenna substrate elements, and each respective one of the plurality of antenna substrate elements has a respective one of the plurality of radiating elements thereon.

7. The system of claim 1, wherein the image sensor is at least one of an optical sensor, an infrared sensor, or a UV sensor.

8. The system of claim 1, wherein the image sensor includes a first center and the one or more antenna substrates include a second center, and the first center and the second center are aligned to a longitudinal axis of the body.

9. The system of claim 1, wherein the system includes a controller including one or more processors, wherein the controller is communicatively coupled to the image sensor and the plurality of radiating elements.

10. The system of claim 9, wherein the one or more processors are configured to execute program instructions that cause the one or more processors to:
  receive the image, and
  apply a target identification algorithm to the image to track a target.

11. The system of claim 10, wherein the one or more processors are configured to execute additional program instructions that cause the one or more processors to:
  send control signals to one or more control surfaces on the body to control a trajectory of the body and steer the body toward the target.

12. The system of claim 1, wherein the plurality of radiating elements are connected to input/output (IO) lines.

13. The system of claim 1, wherein the plurality of radiating elements are connected to power lines.

14. The system of claim 1, wherein the plurality of radiating elements operate as an active radar.

15. The system of claim 1, further comprising one or more lenses.

16. A co-located sensor system, comprising:
  a housing including an aperture;
  a window attached, secured, or adhered to the housing at the aperture;
  one or more antenna substrates attached, secured, or adhered to the window;
  a plurality of radiating elements, wherein each respective one of the plurality of radiating elements is attached, secured, or adhered to the one or more antenna substrates; and
  an image sensor configured to capture an image in front of the housing,
  wherein the image sensor is behind the aperture,
  wherein the image sensor is configured to focus at an infinity focus in front of the housing,
  wherein the one or more antenna substrates include a plurality of holes arranged in a grid pattern configured to let photons pass through the antenna substrates from the window to the image sensor,
  wherein the photons are moving in parallel rays,
  wherein the captured image does not include features of the antenna substrates.

17. The system of claim 16, wherein the housing is at least one of an aircraft vehicle structure, a land vehicle structure, or a marine vehicle structure.

18. The system of claim 16, wherein the one or more antenna substrates is a single substrate, and the plurality of holes are holes in the single substrate.

19. The system of claim 16, wherein the one or more antenna substrates comprises a plurality of antenna substrate elements, and each respective one of the plurality of antenna substrate elements has a respective one of the plurality of radiating elements thereon.

20. The system of claim 16, wherein the image sensor is at least one of an optical sensor, an infrared sensor, or a UV sensor.

* * * * *